United States Patent

[11] 3,602,228

| [72] | Inventor | Calvin C. Cowley<br>Los Angeles, Calif. |
|---|---|---|
| [21] | Appl. No. | 764,736 |
| [22] | Filed | Oct. 3, 1968 |
| [45] | Patented | Aug. 31, 1971 |
| [73] | Assignee | C. R. Bard Inc.<br>Murray Hill, N.J. |

[54] FUNNEL UNIT FOR PLASTIC CATHETER
2 Claims, 3 Drawing Figs.

[52] U.S. Cl................................................. 128/349, 285/155
[51] Int. Cl.................................................. A61m 25/00
[50] Field of Search....................................... 128/348–351, 325, 344, 246; 285/155, 190

[56] References Cited
UNITED STATES PATENTS

| 3,467,103 | 9/1969 | McKinstry et al. ........... | 128/349 |
| 2,423,069 | 6/1947 | McElhose et al. ............ | 285/190 X |
| 2,912,981 | 11/1959 | Keough ........................ | 128/349 |
| 3,112,748 | 12/1963 | Colburn ....................... | 128/350 |
| 3,145,035 | 8/1964 | Hanback ...................... | 285/190 X |
| 3,385,301 | 5/1968 | Harautuneian................ | 128/349 |
| 3,448,739 | 6/1969 | Starr et al. .................... | 128/2.05 |

*Primary Examiner*—Dalton L. Truluck
*Attorney*—W. Saxton Seward

ABSTRACT: A funnel unit for assembly on an extruded plastic Foley catheter comprising a Y-connector attachable to the catheter tube and provided with an annular internal recess in communication with the inflation funnel and designed to register with the inlet to the inflation lumen in all rotational positions of the unit on the tube.

PATENTED AUG 31 1971

3,602,228

INVENTOR.
CALVIN C. COWLEY
BY
*nolte and nolte*
ATTORNEYS

FUNNEL UNIT FOR PLASTIC CATHETER

FIELD OF INVENTION

It has been customary for many years to make Foley-type catheters by dipping a form repeatedly in latex followed by drying and curing, the drainage and inflation funnels being formed simultaneously and integrally. It is apparent that an extruded tube (e.g., of a suitable plastic material) would be much cheaper to make, but no way has been found to extrude the necessary funnels. (A rudimentary funnel effect is achieved in Sheridan U.S. Pat. No. Re. 25,788, but his involves only a single lumen tube and adapting it to a tube having also an inflation lumen seems impossible). The present invention assumes that the tube can be extruded, the inflation balloon can be attached near the distal end, which end is then sealed and perforated, the proximal end of the tube can be cut and the inflation lumen sealed with an inlet formed through its side wall. At that stage the funnel unit described below is assembled with the tube and a complete catheter results.

The invention comprises a fitting molded of relatively stiff plastic (PVC) in the form of a Y, one branch being designed to constitute an extension of the proximal end of an extruded plastic catheter and the other branch being shaped to connect with an inlet into the inflation lumen of the catheter and to be fitted on its outer end to a fluid source.

A practical embodiment of the invention is shown in the accompanying drawing wherein.

Figure 1:
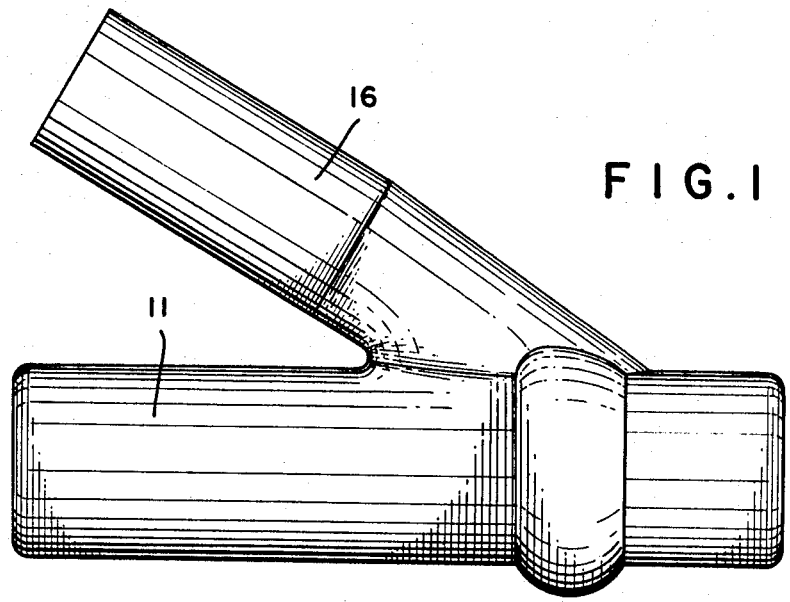
FIG. 1 represents an elevation of the funnel unit, on an enlarged scale.

Referring to the drawings, the extruded plastic catheter 1 has a drainage lumen 2 and an inflation lumen 3, the drainage lumen being sealed off in a known manner at its distal end to form a smooth tip 4, the inflation lumen being sealed both at the distal end and at the proximal end and openings, through the catheter wall being formed at 5, for drainage, at 6 for inflation of the balloon and at 7 for connection of the inflation lumen to the source of inflating fluid. The retention balloon 8, which is normally of latex or plastic having similar elastic properties, is securely affixed to the outside of the catheter as by cementing around the zones 9, 10.

The funnel unit 11 has a cylindrical bore 12 and an outwardly flaring bore 13, the bore 12 being designed to receive the proximal end of the catheter, which is welded or cemented therein, and the bore 13 being shaped to correspond substantially to the drainage funnel of a normal catheter. Between the bores 12 and 13 is an annular shoulder 14, facing toward the bore 12 and providing a stop against which the end of the catheter tube rests. The bore 12 is provided midway of its length with a flat annular groove 15. The funnel unit 11 comprises also a lateral branch 16 the bore of which may be substantially cylindrical and which intersects the bore 12 at an acute angle in the region of the groove 15.

Figure 2:
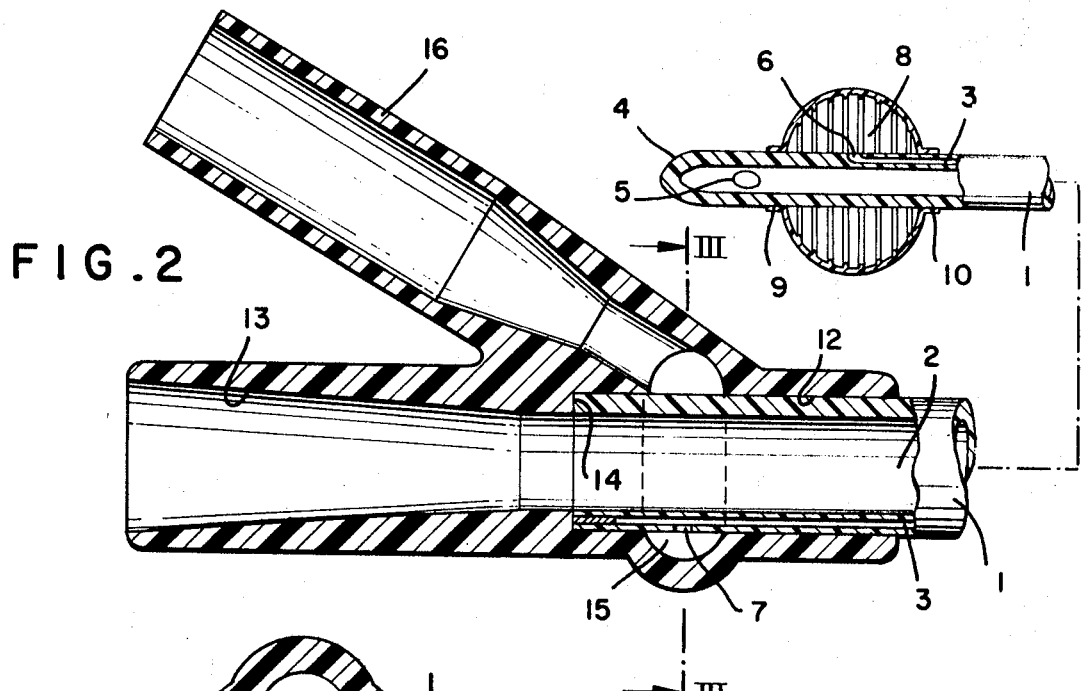
FIG. 2 represents a longitudinal section of the funnel unit with an end of the catheter fixed therein, the continuation of the catheter to its balloon end being indicated diagrammatically.
Figure 3:
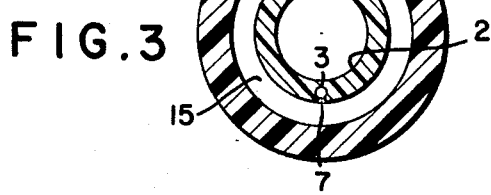
FIG. 3 represents a cross-sectional view on the line III—III of FIG. 2.

The flat annular groove 15 serves the useful purpose of permitting the catheter, with opening 7 in its wall, to be assembled with the funnel unit 11 in complete disregard of the orientation of said opening with respect to the branch 16 of the fitting; the inflation liquid will enter the opening 7 whether the latter is in the position shown in FIGS. 2 and 3 or in any other position around the axis of the catheter. The opening 7 is so spaced from the end of the catheter that it will register with the groove 15 when said end is brought to rest against the shoulder 14. The assembly of the funnel unit on the plastic catheter is thus greatly facilitated.

What I Claim is:

1. A balloon catheter having an extruded plastic shaft containing a drainage lumen and a single inflation lumen, in combination with a double-funnel unit comprising a molded plastic body having a cylindrical bore extending into said body from the distal end thereof to a point spaced from said end and being of a size to receive the proximal end portion of the catheter, and a coaxial continuation of said bore, the diameter of said continuation being less than that of said bore at a point adjacent said first-named point and increasing toward the proximal end of said body to form a flaring first funnel for connection to a drainage tube, said catheter proximal end portion being received within said cylindrical bore and extending proximally within said bore to adjacent said first-named point, a lateral branch having a bore in communication with said cylindrical bore and an integral outward continuation of said branch bore forming a second funnel for a source of inflating fluid, and an annular groove in the interior wall of the cylindrical bore, the branch bore being in communication with said groove, the radially outer surface of proximal end portion of the catheter forming a radially inner wall of said groove to constitute thereby an annular channel and said catheter surface being perforated at a point in register circumferentially with the inflation lumen, said last named point being located in the area of said radially inner wall, whereby communication is established between said channel and said inflation lumen in any angular position of said molded plastic body with respect to said end portion of the catheter.

2. A balloon catheter and funnel unit according to claim 5 which includes an annular shoulder between the cylindrical bore and the axial continuation thereof, said shoulder facing in the direction of the cylindrical bore.